United States Patent [19]

Fahrig et al.

[11] Patent Number: 4,871,699
[45] Date of Patent: Oct. 3, 1989

[54] PROCESS FOR REDUCING COKE ON SPENT CATALYST IN A FLUID CATALYTIC CRACKING UNIT

[75] Inventors: Robert J. Fahrig, Lansing, Ill.; William D. Fitzharris, Houston, Tex.; James L. Aderhold Jr., Wheaton, Ill.

[73] Assignee: Amoco Corporation, Chicago, Ill.

[21] Appl. No.: 285,847

[22] Filed: Dec. 16, 1988

Related U.S. Application Data

[63] Continuation of Ser. No. 142,485, Jan. 11, 1988, abandoned.

[51] Int. Cl.⁴ .............................................. B01J 38/04
[52] U.S. Cl. ..................................... 502/34; 502/518; 208/52 CT; 208/113; 208/164
[58] Field of Search ............. 502/34, 518; 208/52 CT, 208/113, 164

[56] References Cited

U.S. PATENT DOCUMENTS

| | | | |
|---|---|---|---|
| 2,367,474 | 1/1945 | Stewart | 502/30 |
| 2,456,148 | 12/1948 | Read, Jr. | 502/31 |
| 2,919,251 | 12/1959 | Shuman | 502/29 |
| 3,373,102 | 3/1968 | Schulman | 502/31 |
| 4,144,189 | 3/1979 | Kirkbride | 208/1 B |
| 4,708,788 | 11/1987 | Low | 208/112 |

FOREIGN PATENT DOCUMENTS

0045178 2/1982 European Pat. Off. ............ 208/112

Primary Examiner—Anthony McFarlane
Attorney, Agent, or Firm—Thomas W. Tolpin; William H. Magidson; Ralph C. Medhurst

[57] ABSTRACT

A process in which coke is reduced and volatile products yield increased in a catalytic cracking system wherein spent cracking catalyst is stripped in the presence of a hydrogen donor.

14 Claims, 3 Drawing Sheets

PROCESS FOR REDUCING COKE ON SPENT CATALYST IN A FLUID CATALYTIC CRACKING UNIT

This is a continuation of application Ser. No. 7/142,485 filed Jan. 11, 1988 (now abandoned).

BACKGROUND OF THE INVENTION

The present invention relates to catalytic cracking of hydrocarbons, and more particularly relates to a process for reducing coke on spent catalyst during catalytic cracking.

One of the problems that has plagued the catalytic cracking art, and which has heretofore defied satisfactory solution, is the formation of "coke" during the cracking process which contaminates the catalysts and inhibits their effectiveness.

Regeneration of the contaminated or spent catalyst has proven to be a complex procedure requiring costly equipment. Heretofore, the "coke" had to be burned from the catalyst periodically. However, cracking catalysts in use today are susceptible to heat damage at temperatures which can develop during combustion. Such damage is aggravated by the presence of water vapor at high temperatures which is formed during the combustion of the carbonaceous material contaminating the catalyst. Gas purging or steam stripping of catalyst is usually employed to partially remove entrained hydrocarbons that may be volatized and recovered before the catalyst moves to the regeneration zone. Any hydrocarbon or coke not removed before regeneration is lost due to combustion which decreases product yield.

The problems associated with the burning of coke on the catalyst make it necessary to employ arrangements which dissipate the heat formed during regeneration. Heat transfer coils and heat exchangers have been utilized as expedients for this purpose.

In addition, there have been numerous prior art attempts to improve the reaction step in an effort to reduce the formation of coke on the catalyst and accordingly reduce the burden on the regeneration portion of the process.

One prior art approach to the problem involves prehydrogenation of the charge-stocks prior to the cracking operation. Another approach involves blending high hydrogen transfer hydrogen-donor-type feedstocks with the charge stock so that the catalytic cracking process is carried out in the presence of a "hydrogen donor". See U.S. Pat. Nos. 3,413,212 and 3,533,936.

European Patent Application No. 0045178 described the conversion of carbonaceous material to liquids when contacted with vapor phase hydrogen donors for short contact times (1-10 seconds) at 1000° F. and atmospheric pressure. The hydrogen donors are nitrogen compounds such as 1,2,3,4-tetrahydroquinoline; 1,2,3,4-tetrahydroisoquinoline; 1,2,3,4-tetrahydrocarbazole and indoline.

U.S. Pat. No. 3,413,212 discloses the use of zeolitic fluid catalytic cracking unit catalyst to promote reaction of water with deposited hydrocarbons. The same effect was not observed with inert stripping atmospheres such as nitrogen, argon or helium.

I. P. Fisher, Fuel, Vol 65, p. 473-79 (April, 1986) reported that microactivity apparatus results indicate that "additive" and "catalytic" coke yields from vacuum tower resid were insensitive to feed dilution with a hydrogen donor. The hydrogen donor was hydrotreated FCU LCO containing 44% substituted tetralins. It was also reported that exposure to stripping steam after regeneration increases activity and selectivity of zeolytic catalysts, and that long exposure (1-10 minutes) of spent catalyst to steam increases catalytic activity and increases selectivity toward higher naphtha and lower coke yield.

However, the art has yet to provide a satisfactory solution to the problem. One of the reasons for the prior art failure is that heretofore, coke was believed to be a stable carbon material. It has now been found that a portion of the coke is actually an immediately reactive, rapidly polymerizing organic complex, which, if contacted on spent catalyst with a hydrogen donor within a very short, critical time period after passing out of the primary reactor zone and into the stripper section of a catalytic cracking unit or to a separate hydrogen donor-stripper custom assembly, can readily be removed therefrom at normal processing temperatures and conditions.

Thus, the present invention fulfills a longstanding need.

SUMMARY OF THE INVENTION

In one aspect, the present invention comprises an improved method for reducing the amount of coke deposited on spent catalyst being removed from the cracking section or the conversion zone of a catalytic cracking unit in which hydrocarbons boiling at a temperature of greater than 400° F. are being treated and increasing volatile product yield in a catalytic cracking system having a hydrocarbon conversion zone, a stripping zone and a regeneration zone comprising the steps of: rapidly mixing a hydrogen donor with the spent catalyst passing from a primary cracking stage in a catalytic cracking unit within one minute of completion of the cracking stage; maintaining a reaction-stripping temperature above the boiling point of the donor within the stripping zone; and conveying the catalyst to a regenerator for removal of the remaining coke/hydrocarbons occluding the catalyst.

In a preferred embodiment, the process of the present invention comprises the steps of: (a) introducing hydrocarbon feed material and cracking catalyst into the hydrocarbon converting zone under conditions causing substantial cracking of the feed material to lighter product and resulting in spent catalyst; (b) separating products from the spent catalyst; (c) conveying the spent catalyst to the stripping zone and immediately contacting the catalyst with a suitable hydrogen donor, preferably one selected from the group consisting of 1,2,3,4-tetrahydronaphthalene, 9,10-dihydroanthracene, and other partially hydrogenated hydroaromatics at a temperature above the boiling point of the donor, preferably from 750° F. to 1100° F., at pressures of from 5 to 50 psig for up to 60 seconds, whereby a substantial portion of absorbed coke adhering to the catalyst reacts and is then removed; (d) separating the donor from the catalyst and conveying the catalyst to the regeneration zone; and (e) burning off any remaining absorbed coke from the catalyst in the regeneration zone and conveying the restored catalyst to the conversion zone.

The term "hydrogen donor" refers to compounds which readily transfer atomic hydrogen to unsaturated and unstable olefinic free radical hydrocarbons.

Preferred hydrogen donors are tetrahydronaphthalene or anthracene-type donors, i.e. partially hydrogenated compounds having 2 or 3 rings. An especially preferred hydrogen donor is tetralin (1,2,3,4-tetrahydronapthalene). Another preferred hydrogen donor is 9,10-dihyroanthracene. Other hydrogen donors which may be used in the practice of this invention include refinery streams such as hydrotreated select boiling range naphthas and distillate oils.

The selection of a hydrogen donor is critical. Full FCU cycle oil and hydrotreated heavy oil, for example, may increase coke formation. Generally speaking, hydrogen donors having more than four rings are unsuitable for use in the present invention. Other compounds which release hydrogen-rich fragments may be suitable.

The terms "spent catalyst", "contaminated catalyst", "spent promoter" and "spent material" as used herein mean a catalyst, promoter, or material, respectively, which has been at least partially deactivated.

The exact mechanism of action of this invention is not known. However, the art has generally accepted the concept that coke is stable, primarily homogeneous carbon. However, it has now been found that coke, when newly deposited on a catalyst as it circulates from the conversion zone of a cracking unit, is not homogeneous and is momentarily labile. During cracking, clusters of condensed, aromatic hydrocarbons joined by methylene and other bridges are formed. These large molecules can be thermally cleaved at these linkages to create free radicals which are fleetingly labile and may be immediately capped with hydrogen or a stable alkyl radical contributed by a suitable donor to achieve sufficient volatility to escape the reactor system and be recovered as liquid fractionator products. Much of the carbonaceous deposit formed on catalyst immediately entering the stripper portion of an FCU system may be termed coke precursor.

Thus, the material commonly entering the top of a stripper during catalytic cracking is a complex mixture of unvaporized high-boiling hydrocarbons rapidly undergoing thermal and condensation reactions which result in lighter hydrogen-rich fragments splitting off. The "coke" formed during these reactions has now been found to be highly reactive with many unstable free-radical sites, which, if left to proceed to thermal completion in the time required to pass through the stripper, or approximately within two minutes, will polymerize or combine and form highly condensed polynuclear aromatic compounds that are no longer reactive. Stripping such reactive coke with only an inert gas such as nitrogen or steam allows condensation coking reactions to proceed to completion.

In one preferred embodiment of this invention, conventional processing equipment is employed. Tetrahydronaphthalene-type donor solvent is added to a stripper section of a cracking unit at a point during, past or beyond the reaction zone to reduce coke forming on the catalyst from the reactor and thereby enhancing product yield and the efficiency of the stripper operation.

A more detailed explanation of the invention is provided in the following description and appended claims taken in conjunction with the accompanying drawings.

DETAILED DESCRIPTION OF PREFERRED EMBODIMENTS

Figure 1:
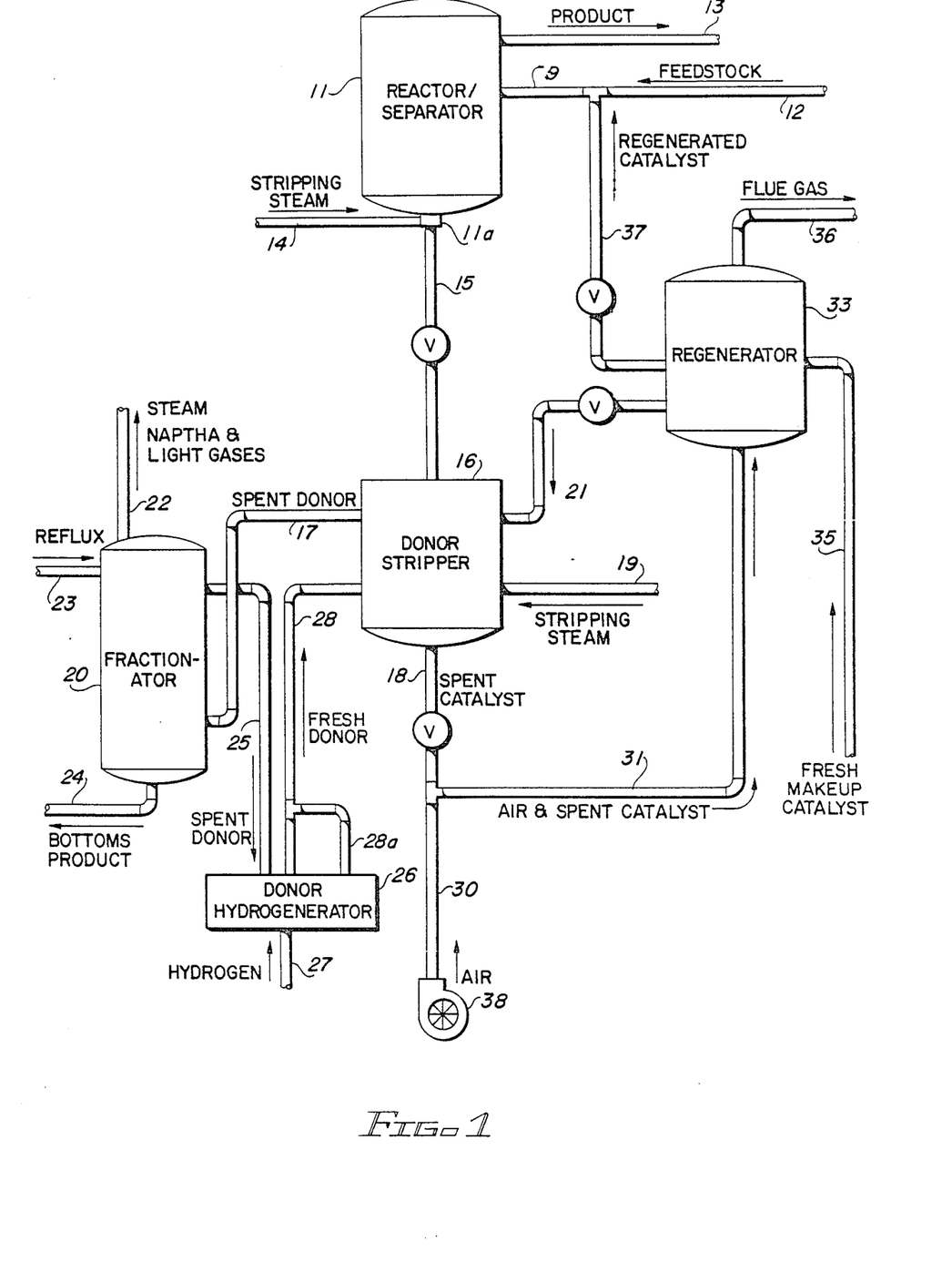
FIG. 1 is a schematic flow diagram of a preferred embodiment of the catalytic hydrogen donor treatment in accordance with the principles of the present invention.

While standard processing assemblies may be used to incorporate the solvent treatment process of the present invention, as will be explained later in detail, FIG. 1 depicts a preferred process assembly for the catalytic donor solvent treatment of this invention.

Referring to FIG. 1, a hydrocarbon feedstock, such as gas oil, is fed through feedstock line 12 into reactor riser pipe 9 which discharges into catalytic cracking reactor/separator vessel 11 in a catalytic cracking unit. Fresh makeup catalytic cracking catalyst is supplied through fresh make-up line 35. Regenerated catalyst is supplied by line 37 from regenerator 33 which joins with feed line 12 before entry into the riser pipe reactor. The catalytically cracked hydrocarbons are withdrawn from the top of the reactor through overhead product line 13 and conveyed to downstream processing equipment (not shown) for further upgrade, separation into fractions and/or other processing.

Spent catalyst is discharged from the reactor and exposed to a stripping gas, such as steam, supplied to a short stripping section 11a in the lower part of the reactor/separator 11 by line 14 as it is being withdrawn from the fluidized reactor bed. The stripping gas removes some of the reaction products but leaves the coke, which occludes the catalyst as it is conveyed from the reactor through line 15 into donor stripper 16 where it is mixed with hydrogen donor which adds hydrogen and converts a substantial portion of the coke burdening the catalyst.

It is critical to expose the spent catalyst to a hydrogen donor within one minute from its removal from the reactor. After a two minute period, the coke precursors stabilize as explained in detail above. For best results, the spent catalyst is immediately contacted with the hydrogen donor following its removal from the reactor. In operation, the spent catalyst is treated with from 5 to 30 weight percent of donor based on feed weight of within 60 seconds, preferably immediately following removal from the conversion zone of the reactor at temperatures at least above the boiling point of the hydrogen donor under the prevailing pressure, and preferably from about 800° F. to 1000° F., for up to 60 seconds, most preferably for less than 30 seconds.

The reactive products from the coke which are removed from the catalyst are withdrawn from donor stripper 16 along with steam and deleted hydrogen donor by line 17 to fractionator 20 where the products are separated, with the light product removed through outlet line 22 and bottoms product carried away by line 24 at the lower portion of the fractionator. Reflux return 23 conveys condensed byproduct back to fractionator 20. Spent donor coming from the fractionator is pumped through line 25 to donor hydrogenator 26 supplied with hydrogen source 27 wherein the hydrogen depleted donor is converted back to partially saturated hydroaromatics and returned as fresh donor by the return line 28 to donor stripper 16. Fresh make-up donor is added to line 28 through line 28a as required.

Regenerated catalyst return line 21 connects regenerator 33 with donor stripper 16 to allow elevation of the stripper temperature. Spent catalyst which has been partially decoked is further treated by stripping to remove donor, such as with steam supplied by pipe 19.

Air is injected upwardly to mix with treated catalyst through air injector line 30 supplied by air compressor 38 and carried through return line 31 to regenerator 33. The air is injected at a flow rate and pressure sufficient to fluidize and convey the spent catalyst particles upwardly through the regenerator. Combustion flue gases are withdrawn from the top of the combustor regenerator through off-gas line 36.

Figure 2:
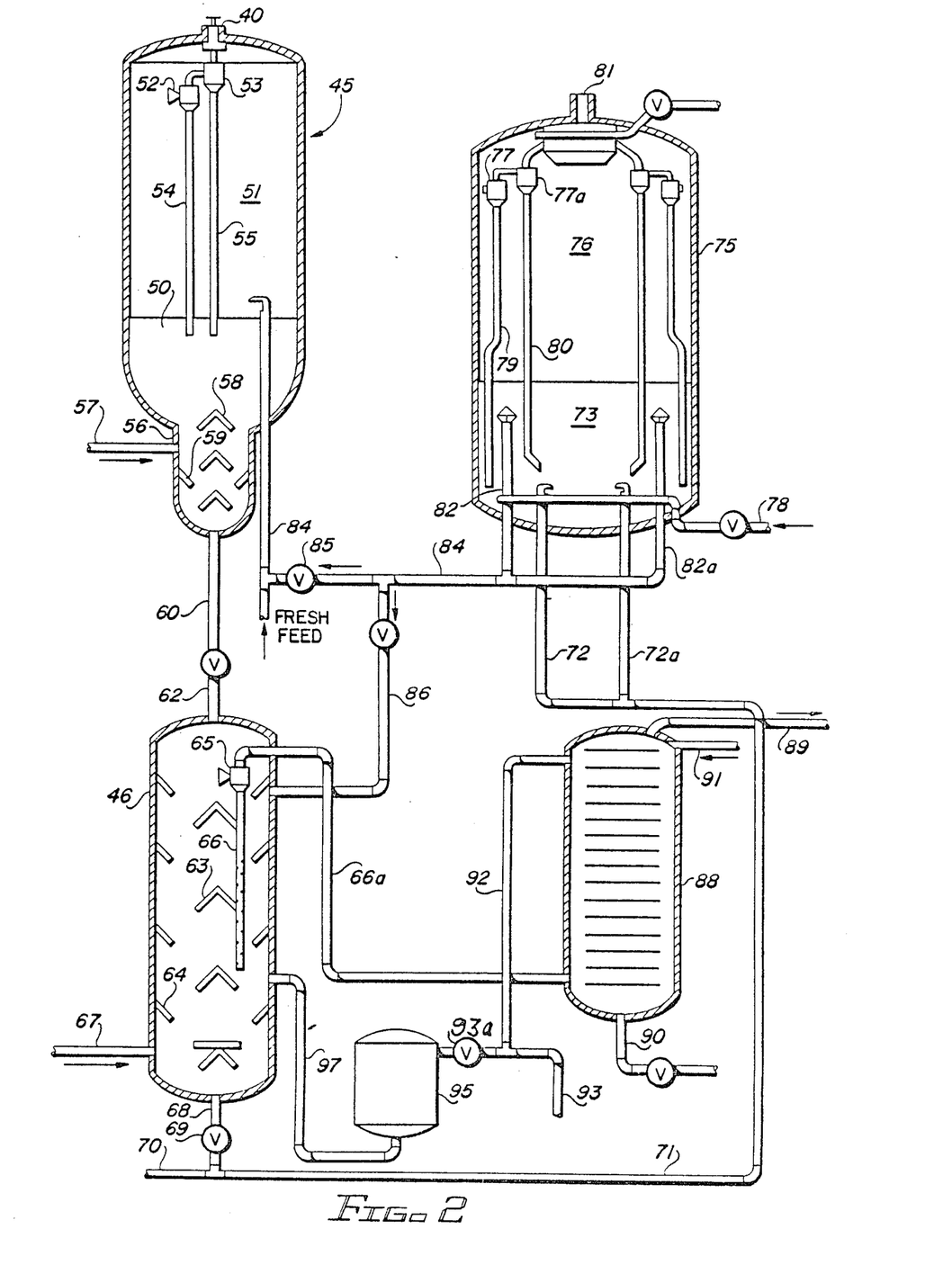
FIG. 2 is a schematic flow diagram of a part of the preferred embodiment with portions cut away for clarity and understanding.

FIG. 2 illustrates the schematic of FIG. 1 in greater detail, with component parts cut away for greater clarity and ease of understanding. Reactor/separator 45 is depicted as an elongated vessel. The fluid catalytic cracker has a dilute phase upper portion 51 and a dense phase lower portion 50. Internal cyclones 52 and 53 are adapted to remove cracking catalyst particles from the gaseous product stream before the product is removed from the reactor through product outlet 40. Cyclone dipleg lines 54 and 55 extend downward from the cyclones to the lower portion of the reactor. Several modifications such as external cyclones can be provided. Reactor 45 can also have stripping section 56 provided with internals such as baffles 58 and doughnuts 59 attached to the smaller cross-sectional area of the FCU. Stripping gas, preferably steam, is introduced through steam line 57 into the stripping section to strip volatile hydrocarbons occluding the catalyst particles. The stripping gas also fluidizes the catalyst in the stripping section and in the dense phase lower portion of the reactor. Spent catalyst passes from the bottom of the stripper section through spent catalyst line 60 and by control valve 62 into hydrogen donor stripper unit 46.

In the donor stripper 46, spent coked catalyst is mixed and promptly reacted with a substantial percentage of a hydrogen donor in an amount and under velocity and temperature conditions sufficient to cause a marked reduction in the level of coke adhering to the catalyst. Stripper 46 is provided, preferably, with conical baffles 63 and doughnuts 64 adhering to the walls of the stripper body assembly. Stripping steam is introduced into a lower portion of the stripper by steam line 67 to strip products and donor from the catalyst and the coke-reduced catalyst particles are withdrawn by outlet line 68 via control valve 69 into return line 71 through which it is carried by air supplied by air source line 70.

Return line 71 carries reduced-coke catalyst into regenerator 75 into which it is introduced by inlet branches 72 and 72a. The spent catalyst is introduced into dense phase bed 73 into which air or oxygen-containing gas is introduced by line 78 to burn carbonaceous materials adhering to the surface of the catalyst particles. The regenerator is provided with separators such as cyclones 77 and 77a positioned in the dilute phase upper section 76 of the unit. Cyclone diplegs 79 and 80 extend downwardly below the surface of dense phase 73. Entrapped catalyst particles are returned to the dense phase and flue gases are discharged through the cyclone separators and flue line 81. Regenerated catalyst is withdrawn from the regenerator by catalyst lines 82 and 82a into reactor inlet line 84 by valve 85 and recycled into reactor 45. It is joined with hydrocarbon feedstock. Regenerated catalyst return line 86 connects the regenerator outlet line 84 with stripper unit 46 to allow elevation of the donor stripper temperature.

Spent hydrogen donor and product vapor is conveyed from stripper 46 through separator 65 and into line 66a to fractionator 88 where light product fraction is removed by line 89 and bottoms product by outlet 90. Reflux return line 91 empties back to the assembly. Spent donor is carried by line 92 from the fractionator through valve 93a into donor hydrogenator 95 equipped with hydrogen source 96. Vessel 95 operates at elevated temperatures and pressure to rehydrogenate the spent donor. Fresh alternate donor can be introduced into line 92 through donor supply line 93. Freshly hydrogenated donor is cycled back through lines 97 into donor stripper 46.

While FIGS. and 2 depict customized arrangements for practicing the present invention, it is not necessary, nor sometimes desirable, to employ such arrangements. In many instances, standard processing equipment may be used to reduce the coke burden on spent catalyst using all types of equipment. It is most economical to use the process of this invention in a conventional fluidized catalytic cracking system into which hydrogen donor material is introduced into a stripper section or unit after the cracking reaction at a level of from 5 to 50% by weight of the fresh feed rate to react immediately with newly formed coke that would later occlude the surface of the catalyst and rapidly condense to stable carbonaceous material requiring burning for removal.

Suitable hydrocarbon feedstocks for the catalytic cracking unit preferably have a boiling point above the gasoline boiling range, for example from about 400° F. to 1200° F., and are generally catalytically cracked at temperatures ranging from about 850° F. to about 1200° F. Such feedstocks can include various mineral oil fractions boiling above the gasoline range, such as light gas oils, heavy gas oils, wide-cut gas oils, vacuum gas oils, coker gas oil and hydrotreated gas oils, kerosenes, decanted oils, resid from crudes, and cycle oils derived from any of these, as well as suitable fractions derived from shale oil, tar sands oil, diatomaceous earth oil, coal liquification products, or other synthetic oils. Such fractions may be employed alone or in any desired combination.

Catalytic cracking of heavy mineral oil fractions is a important refining operation in the above the gasoline boiling range, for example from about 400° F. to 1200° F., and are generally catalytically cracked at temperatures ranging from about 850° F. to about 1200° F. Such feedstocks can include various mineral oil fractions boiling above the gasoline range, such as light gas oils, heavy gas oils, wide-cut gas oils, vacuum gas oils, coker gas oil and hydrotreated gas oils, kerosenes, decanted oils, resid from crudes, and cycle oils derived from any of these, as well as suitable fractions derived from shale oil, tar sands oil, diatomaceous earth oil, coal liquification products, or other synthetic oils. Such fractions may be employed alone or in any desired combination.

Catalytic cracking of heavy mineral oil fractions is an important refining operation in the conversion of crude oils to desirable fuel products, such as high-octane gasoline fuel used in spark-ignited, internal combustion engines. In fluid catalytic cracking, high molecular weight hydrocarbon liquids or vapors are contacted with hot, finely-divided solid catalyst particles in a riser reactor or fluidized bed reactor such as shown in FIG. 1 or FIG. 2, and the catalyst-hydrocarbon temperature mixtures are maintained at an elevated temperature in a fluidized or dispersed state for a sufficient period of time to obtain the desired degree of cracking to lower molecular weight hydrocarbons typically present in motor gasoline and distillate fuels.

In usual cases where riser cracking is employed for conversion of a gas oil, the throughput ratio, or volume of total feed to fresh feed, may vary from about 1 to 1.5. The conversion level may vary from about 40 to about 90 weight percent and advantageously is maintained above about 60 weight percent, for example, between about 60 and 90 weight percent. The term "conversion" is generally used herein as the percentage reduction by volume of hydrocarbons boiling above about 430° F. at atmospheric pressure by the formation of lighter materials or coke.

The weight ratio of total cracking catalyst-to-oil in the riser reactor can vary widely within the range of from about 2 to about 10, in order that the fluidized dispersion will have a density within the range of from about 1 to about 20, preferably 1 to 10 pounds per cubic foot. Desirably, the catalyst-to-oil ration is maintained within the range of from about 3 to 10, preferably 3 to 7 for best results. The fluidizing velocity in the riser reactor (catalytic cracker) can range from about 10 to about 100 feet per second, preferably 10 to 50 feet per second. The riser reactor can have a ratio of length-to-average diameter of about 25 to 60.

For production of a typical naphtha product, the bottom section mixing temperature within the catalytic cracker or riser reactor is advantageously maintained at about 900° F. to about 1200° F. for vaporization of the oil feed so that the top section product exit temperature will be about 850° F. to 1150° F.

Under the above conditions, including provision for a rapid separation of spent catalyst from effluent oil vapor, a very short period of contact between the cracking catalyst and oil will be established. Contact time within the riser reactor (catalytic cracker) will generally be within the range of from about 1 to 15 seconds, preferably within the range of from about 3 to 10 seconds. Short contact times are preferred because most of the hydrocarbon cracking occurs during the initial increment of contact time and undesirable secondary reactions are avoided. This is especially important if higher product yield and selectivity, including lesser coke production, are to be realized.

Short contact time between cracking catalyst particles and oil vapors can be achieved by various means. For example, cracking catalyst may be injected at one or more points along the length of a lower or bottom section of the riser reactor (catalytic cracker or FCC). Similarly, oil feed may be injected at all the points along the length of the lower section of the riser reactor and a different injection point may be employed for fresh and recycle feed streams. Auxiliary nozzles can also be used to disperse resids or other feedstock onto the catalyst for more efficient catalytic cracking reactions. The lower section of the riser reactor above the stripping section may, for this purpose, include up to about 80 percent of the total riser length in order to provide extremely short effective contact times inductive to optimum conversion of petroleum feeds. The reactor is preferably designed to minimize cracking of the product in the dilute phase. Where a dense catalyst bed is employed, provision may also be made for injection of cracking catalyst particles and/or oil feed directly into the dense-bed zone.

While the conversion conditions specified above are generally directed to the production of gasoline as fuel for sparking-ignition internal combustion engines, the process may be suitably varied to permit maximum production of heavier hydrocarbon products such as diesel fuel, heating oil and chemicals, and in particular, olefins and aromatics.

The spent catalyst from the petroleum conversion reaction in the reactor is preferably stripped in the steam stripping section 56 (FIG. 2) prior to entering the hydrogen donor stripper 46. If desired, hydrogen donor can be introduced into steam stripping section 56 in addition to, or in place of treatment in hydrogen donor stripper unit 46 prior to transfer to the regenerator.

The stripping section for use in the fluid bed catalytic cracker may be maintained essentially at a conversion reactor temperature in the range of from about 800° F. to about 1200° F. and preferably above about 820° F. for best results. The preferred stripping gas is steam. The stripping gas can be injected into the stripping section at a pressure of from 5 to 50 psig.

Similar conditions are employed in hydrogen donor stripper 46. Hydrogen donor is injected into the stripper at a pressure of from 5 to 50 psig for best results. The stripping gas is injected into the hydrogen donor stripper at a pressure of about 5 to 50 psig. The solvent/spent catalyst mixture is maintained at a temperature of from 750° F. to 1100° F., preferably 800° F. to 1000° F. and most preferably 820° F. to 950° F. for best results. The pressure within the stripper is maintained at from 5 to 50 psig.

Following stripping in the presence of a hydrogen donor, catalyst regeneration is best accomplished by burning the remaining coke deposits from the catalytic surface with a molecular oxygen-containing gas, such as air. The regenerative oxidation of stable coke may be characterized, in simplified manner as the oxidation of carbon as shown below.

| | | |
|---|---|---|
| $C + O_2$ | $CO_2$ | (a) |
| $2C + O_2$ | $2CO$ | (b) |
| $2CO + O_2$ | $2CO_2$ | (c) |

Reactions (a) and (b) both can occur under typical catalyst regeneration conditions with the catalyst temperature ranging from about 1,050° F. to about 1,450° F. or higher and are exemplary of gas-solid chemical interactions when regenerating cracking catalyst at temperatures within this range. The effect of any increase in temperature is reflected in an increased rate of combustion of carbon and a more complete removal of carbon, or stable coke, from the catalyst particles. As the increased rate of combustion is accompanied by an increased evolution of heat whenever sufficient free or molecular oxygen is present, the gas-phase reaction (c) may occur. This latter reaction is initiated and propagated by free radicals and can be catalyzed.

Stripped deactivated cracking catalyst is regenerated by burning the coke deposits from the catalyst surface with air or some other combustion-sustaining molecular oxygen-containing regeneration gas in a regenerator. This burning results in the formation of combustion products such as sulfur oxides, carbon monoxide, carbon dioxide and steam. The oxygen-containing regeneration gas can contain a diluent, such as nitrogen, steam, carbon dioxide, recycled regenerator effluent gases, and the like. The molecular oxygen concentration of the regeneration gas is ordinarily from about 2 to about 30 volume percent and preferably from about 5 to about 25 volume percent. Since air is conveniently employed as a source of molecular oxygen, a major portion of the inert gas can be nitrogen. The regeneration zone temperatures are ordinarily in the range of from about 1050° F. to about 1450° F. and are preferably in the range of from about 1150° F. to about 1350° F. Other regeneration temperatures may be used in some circumstances. When air is used as the regeneration gas, it can be injected into the bottom of the regenerator from a blower or compressor at a fluidizing velocity in the range of from about 0.15 to about 5 feet per second and preferably from about 0.5 to about 3 feet per second.

Suitable cracking catalysts include those containing silica and/or alumina, including the acidic type. The cracking catalyst may contain other refractory metal oxides such as magnesia or zirconia. Preferred cracking catalyst are those containing crystalline aluminosilicates, zeolites, or molecular sieves, in an amount sufficient to materially increase the cracking activity of the catalyst, e.g., between about 1 and about 50% by weight. The crystalline aluminosilicates can have silica-to-alumina mole ratios of at least about 2:1, such as from about 2 to 12:1, preferably about 4 to 6:1 for best results.

The crystalline aluminosilicates are usually available or made in sodium form and this component can be reduced, for instance, to less than about 4 or even less than about 1% by weight through exchange with hydrogen ions, hydrogen precursors such as ammonium ions, or polyvalent metal ions. Suitable polyvalent metals include calcium, strontium, barium, and the rare earth metals such as cerium, lanthanum, neodymium, and naturally occurring rare earths and their mixtures. Such crystalline materials are able to maintain their pore structure under the high temperature conditions of catalyst manufacture, hydrocarbon processing and catalyst regeneration. The crystalline aluminosilicates often have a uniform pore structure of exceedingly small size with the cross-sectional diameter of the pores being in a size range of about 6 to 20 angstroms. Silica-based cracking catalysts having a major proportion of silica, e.g., about 60 to 90 weight percent silica and about 10 to 40 weight percent alumina, are suitable for admixture with the crystalline aluminosilicate or for use as such as the cracking catalyst. Other cracking catalysts and pore sizes can be used.

The cracking catalyst particles are finely-divided and may have an average particle size in the range of about 150 microns to about 20 microns or less.

The regeneration gas serving to fluidize the dense bed contains free molecular oxygen and the oxygen is preferably charged to the regenerator in an amount somewhat in excess of that required for complete combustion of coke (carbon and hydrogen) to carbon dioxide and steam. The amount of oxygen in excess of that required for complete combustion of the coke may vary from about 0.1 to about 35 or more percent of the theoretical stoichiometric oxygen requirement for complete combustion of the coke, but, advantageously, need not be greater than about 10 percent. For example, when air is employed as the regeneration gas, a 10 percent excess of air provides only about 2 volume percent oxygen in the effluent spent gas stream. Advantageously, the concentration of molecular or free oxygen and carbon monoxide at any point within the regenerator is maintained outside of the explosive range at those conditions to eliminate any risk of detonation.

An oxidation-promoting, carbon monoxide-burning catalyst can be fed to the regenerator to promote complete burning of carbon monoxide to carbon dioxide in the regenerator. The solid oxidation catalyst can be in a finely-divided form, such as powder, separate from the hydrocarbon cracking catalyst, or can be supported on another substrate and admixed with the cracking catalyst. The support for the oxidation catalyst can be less catalytically active, or even inert, to the oxidation and hydrocarbon conversion reactions. Desirably, the support is porous. The support can have a surface area, including the area of the pores on the surface, of at least about 10, preferably at least about 50, square meters per gram. Illustrative of the supports, which may be essentially amorphous, are silica, alumina, silicoalumina and the like. Solid, platinum group metal or rhenium oxidation catalysts may be used as can other oxidation catalysts that promote the oxidation of carbon monoxide in the presence of molecular oxygen. These oxidation catalysts contain a catalytic metal which promotes the oxidations. The metal may be in combined form, such as an oxide, rather than being in the elemental state. The oxidation catalysts can be rhenium or a platinum group metal of group VIII such as platinum, palladium and rhodium. The solid oxidation catalyst may comprise two or more catalytically-active metals either physically or chemically combined. By a chemical combination of metals, there are induced bi- or polymetallic salts or oxides. Illustrative of combinations of catalytically-active metals which may promote oxidation of carbon monoxide without unduly adversely affecting the hydrocarbon cracking operations are combinations of the platinum group metals, e.g. platinum, rhenium, the oxides of iron and rhenium, and the like. Other metals can be used.

The substrate for the solid oxidation-promoting carbon monoxide-burning catalyst may be a portion of the cracking catalyst or may be different therefrom. For example, it may be a non-catalytic, porous, solid substrate. When the hydrocarbon cracking catalyst serves as the substrate, care should be taken in selection of the deposition process such that the cracking activity and selectivity of the catalyst is not adversely affected. It is preferred that if the hydrocarbon cracking catalyst is of the type having ion-exchanged sites, the ion-exchange be completed prior to deposition of the oxidation catalyst. The amount of oxidation-promoting metal employed for promotion of oxidation of carbon monoxide may be in a minor amount effective to enhance the desired oxidation. This amount may be very small, e.g., as little as about 0.01 part per million or less based on the weight of the hydrocarbon cracking catalyst employed. The amount of oxidation-promoting metal may often be at least about 0.1 ppm up to about 5 or 10 ppm. Larger amounts of the oxidation-promoting metal, such as about 0.01 to 5 or about 0.05 to 1 percent by weight based on the hydrocarbon cracking catalyst, may be employed.

Sulfur oxides and particulates from the regenerator/combustion off-gases (flue gases) may be removed and treated as described in U.S. Pat. No. 4,609,539 which is incorporated by reference herein.

EXAMPLE 1

A petroleum-derived feedstock was reacted with a rare earth-containing zeolite catalyst in an experimental unit, comprising a fixed bed of 3.0 grams of catalyst, to which 0.7 cc of the feedstock was delivered over a period of 50 seconds. This apparatus was similar to conventional micro-activity test (MAT) units with a fixed catalyst bed and with a sequenced feed/stripping mode of operation to simulate the cracking zone of a fluidized catalytic cracker. Following the "feed cracking" portion of the experimental sequence, "donor stripping" was accomplished by contacting the catalyst with a stream of nitrogen with 1,2,3,4-tetrahydronaphthalene as the hydrogen donor. This donor stripping was done at the same temperature as the feed cracking.

The petroleum-derived feedstock was a gas oil/resid blend having the following properties:

| Gravity, °API | 25.7 |
|---|---|
| Sulfur, wt % | 1.5 |
| Distillation (Vol % over, TBP Approximate) | |
| 600° F. | 11 |
| 800° F. | 49 |
| 900° F. | 70 |
| 1000° F. | 85 |
| Ramsbottom carbon, wt % | 1.4 |

The catalyst was a sample of equilibrium catalyst from a commercial unit. The predominant catalyst is a typical commercial crystalline zeolite cracking catalyst marketed by Davison Chemical Division of W. R. Grace and designated CBZ-1. It is a rare earth-exchanged Y type faujasite in a silicon/alumina binder having the following characteristics:

| Bulk Density, g/cc | 0.81 |
|---|---|
| Surface Area, m²/g | 158 |
| Pore Volume, cc/g | 0.41 |
| Avg. Particle Size, micron | 63 |

Figure 3:
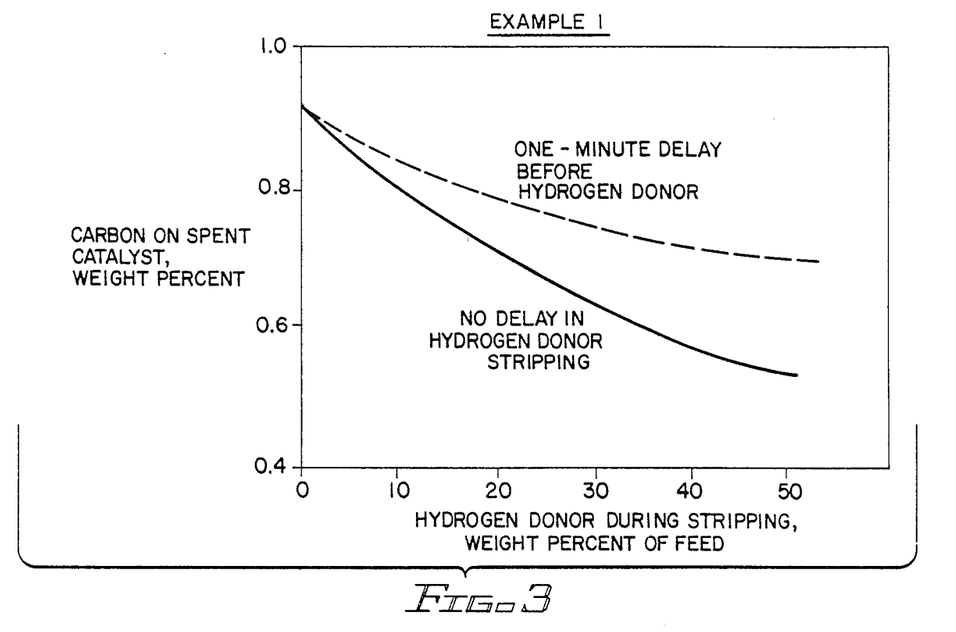
FIG. 3 is a chart illustrating the results obtained in Example 1 in which the levels of carbon deposited on spent catalyst is compared to the level of hydrogen donor incorporated, and the effect of delay before donor is introduced into the feed.

As shown in FIG. 3, if the level of hydrogen donor addition in the "stripping stage" is increased, the carbon content of the spent catalyst, i.e., the coke from feed cracking, is decreased significantly. If a delay of 60 seconds was imposed between the end of the cracking stage and the introduction of the hydrogen donor, the effect of the hydrogen donor was not as great as with immediate addition thereof.

EXAMPLE 2

A different petroleum-derived feedstock was reacted with a rare earth-containing zeolite catalyst in the same experimental unit as described in Example 1. The hydrogen donor stage was also the same as in Example 1, as was the catalyst. The petroleum feedstock was a wide boiling heavy gas oil with the following properties:

| Gravity, °API | 24.1 |
|---|---|
| Sulfur, wt % | 2.5 |
| Distillation (Vol % over, TBP) | |
| 600° F. | 13 |
| 800° F. | 51 |
| 900° F. | 76 |
| 1000° F. | 95 |
| Ramsbottom Carbon, wt % | 0.20 |

Figure 4:
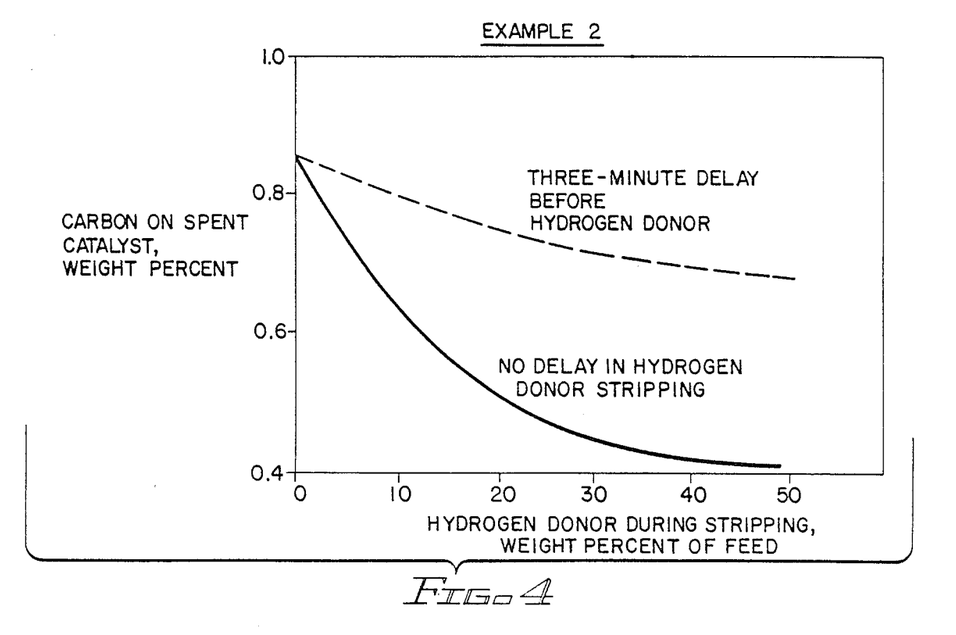
FIG. 4 is a chart depicting results obtained in a study set forth in Example 2.

As shown in FIG. 4, as the level of hydrogen donor addition in the stripping stage is increased, the carbon or coke content of the spent catalyst is decreased significantly. In this run, 1,2,3,4-tetrahydronaphthalene was employed as the hydrogen donor. If a delay of 3 minutes was imposed between the cracking stage and the introduction of the hydrogen donor, the effect of the hydrogen donor was not as great as with immediate addition thereof.

EXAMPLE 3

Gas oil feedstock was reacted with a rare earth-containing zeolite catalyst in a continuous fluidized catalytic cracker laboratory unit at a catalyst to oil weight ratio of 8.5, a feed rate of 14.5 grams per minute, weight hour space volume (WHSV) $Hr^{-1}$ 32 40, catalyst circulation rate of 125 g/min at a temperature of 1000° F., with a feed inlet of hydrocarbon partial pressure of 9.5 psig. The catalyst and hydrogen donor were the same as employed in Example 1. The gas oil feed stock had the following properties:

| Gravity, °API | 19.5 |
|---|---|
| Sulfur, wt % | 2.7 |
| Distillation (Vol % over, TBP) | |
| 600° F. | 0.4 |
| 800° F. | 22 |
| 900° F. | 54 |
| 1000° F. | 86 |
| Ramsbottom Carbon, wt % | 0.7 |

Following cracking, the catalyst was immediately hydrogen donor stripped at 980° F. and 34.7 psig for 35 seconds with 1,2,3,4-tetrahydronaphthalene at a donor rate of 23 weight percent of the fresh feed rate, or 53 lb donor per ton of catalyst, followed by steam stripping for 35 seconds at 6.7 lb $H_2O$ per ton of catalyst. A twenty two percent (22%) reduction in final coke compared to that resulting after base case steam stripping alone. Regeneration was carried out at an average bed temperature of 1280° F. and flue gas excess oxygen volume of two percent (2%).

While the subject hydrogen donor stripping process is particularly useful to convert coke to hydrocarbons prior to regenerating the catalyst in a fluid catalytic cracking unit, it can also be useful to convert coke to hydrocarbons prior to regenerating the catalyst/heat carrier material in other refining processes, such as in an ART unit in which inert or very lo activity catalysts, substrates or heat carrier materials are used in a riser with an oil feedstock such as petroleum, petroleum fractions, and synthetic oil, including shale oil, tar sands oil, gilsonite oil, coal liquids, and bitumen, or in the pyrolysis of coal, oil shale, and tar sands.

Although embodiments of this invention have been shown and described, it is to be understood that various modifications and substitutions, as well as rearrangement and combinations of parts, components, equipment, and/or process steps, can be made by those skilled in the art without departing from the novel spirit and scope of this invention.

What is claimed is:

1. The process of reducing coke and increasing volatile product yield in a catalytic cracking system wherein there is provided a hydrocarbon conversion zone, a stripping zone and a regeneration zone comprising:
   (a) introducing hydrocarbon feed material and cracking catalyst into the hydrocarbon converting zone under conditions causing substantial cracking of the feed material to light product and spent catalyst;
   (b) separating product from the spent catalyst:
   (c) conveying the spent catalyst to the stripping zone maintained at a pressure of from about 5 to about 50 psi within less than about minute from completion of cracking contacting the catalyst with a hydrogen donor in the vapor phase at a temperature above the boiling point of the donor, whereby a substantial portion of absorbed coke adhering to the catalyst is removed, prevented from forming or both;

(d) separating the donor from the catalyst and conveying the catalyst to the regeneration zone; and (e) burning off any remaining absorbed coke from the catalyst in the regeneration zone and conveying the restored catalyst to the conversion zone.

2. The process of claim 1 wherein the hydrocarbon feed material has an average boiling point of from about 400° to about 1300° F.

3. The process of claim 1 wherein the donor comprises from about 5 to about 50 percent by weight of the feed material.

4. The process of claim 1 wherein the donor/spent catalyst mixture temperature is maintained at from about 750° to about 1100° during the period whereby said donor is in contact with the catalyst.

5. The process of claim 1 wherein the donor is selected from the group consisting of 1,2,3,4-tetrahydronaphthalene, 9,10-dihydroanthracene and partially hydrogenated hydroaromatics.

6. The process of reducing coke and increasing volatile product yield in a catalytic cracking system, said system having a hydrocarbon conversion zone, a stripping zone and a regeneration zone, comprising:

(a) introducing hydrocarbon feed material and cracking catalyst into the hydrocarbon converting zone under conditions causing substantial cracking of the feed material to light product and spent catalyst;

(b) separating product from the spent catalyst;

(c) conveying the spent catalyst to the stripping zone and within less than about one minute from completion of cracking contacting the catalyst with a hydrogen donor in the vapor phase selected from the group consisting of 1,2,3,4-tetrahydronaphthalene and 9,10-dihydroanthracene at a temperature above the boiling point of the donor and at pressures of from about 5 to about 50 psi, whereby a substantial portion of absorbed coke adhering to the catalyst is removed;

(d) separating the donor from the catalyst and conveying the catalyst to the regeneration zone; and (e) burning off any remaining absorbed coke from the catalyst in the regeneration zone and conveying the restored catalyst to the conversation zone.

7. The process of claim 6 wherein said catalyst is contacted with said hydrogen donor solvent for up to about 60 seconds.

8. The process of claim 7 wherein said catalyst is contacted with said hydrogen donor at a temperature of from about 800° F. to about 1000° F.

9. The process of claim 6 wherein said hydrogen donor is 1,2,3,4-tetrahydronaphthalene.

10. The process of claim 7 wherein said hydrogen donor is 1,2,3,4-tetrahydronaphthalene.

11. The process of claim 7 wherein said hydrogen donor is 1,2,3,4-tetrahydronaphthalene.

12. The process of claim 6 wherein said hydrogen donor is 9,10-dihydroanthracene.

13. The process of claim 7 wherein said hydrogen donor is 9,10-dihydroanthracene.

14. The process of claim 8 wherein said hydrogen donor is 9,10-dihydroanthracene.

* * * * *

UNITED STATES PATENT AND TRADEMARK OFFICE
CERTIFICATE OF CORRECTION

PATENT NO. : 4,871,699
DATED : October 3, 1989
INVENTOR(S) : Fahrig, et. al.

It is certified that error appears in the above-identified patent and that said Letters Patent is hereby corrected as shown below:

| Col. | Line | |
|---|---|---|
| 4 | 56 | "deleted" should read --depleted-- |
| 6 | 9 | "pressure" should read --pressures-- |
| 6 | 14 | "FIGS. and 2" should read --FIGS. 1 and 2-- |
| 7 | 20 | "ration" should read --ratio-- |
| 8 | 39 | "$C + O_2 \quad CO_2$" should read --$C + O_2 \rightarrow CO_2$-- |
| 8 | 40 | "$2C + O_2 \quad 2CO$" should read --$2C + O_2 \rightarrow 2CO$-- |
| 8 | 41 | "$2CO + O_2 \quad 2CO_2$" should read --$2CO + O_2 \rightarrow 2CO_2$-- |
| 12 | 63 | "catalyst:" should read --catalyst;-- |
| 12 | 66 | "about minute" should read --about one minute-- |
| 13 | 18 | "$1100°$" should read --$1100°F.$-- |

UNITED STATES PATENT AND TRADEMARK OFFICE
CERTIFICATE OF CORRECTION

PATENT NO. : 4,871,699

DATED : October 3, 1989

INVENTOR(S) : Fahrig, et. al.

It is certified that error appears in the above-identified patent and that said Letters Patent is hereby corrected as shown below:

| Col. | Line | |
| --- | --- | --- |
| 14 | 15 | "conversation" should read --conversion-- |

Signed and Sealed this

Twenty-fifth Day of May, 1993

Attest:

MICHAEL K. KIRK

Attesting Officer    Acting Commissioner of Patents and Trademarks